Oct. 28, 1952
P. A. FRANK
2,615,176
WASTE DISPOSAL UNIT FOR SINKS
Filed April 23, 1947
2 SHEETS—SHEET 1
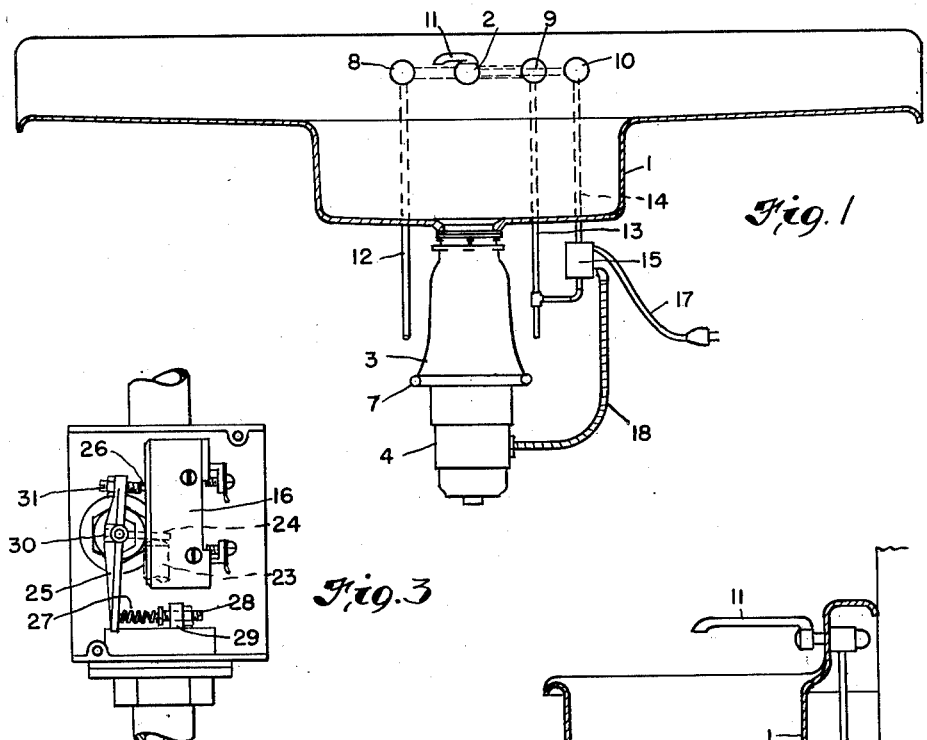
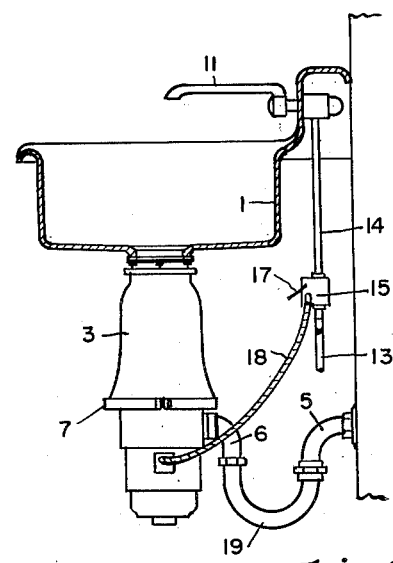
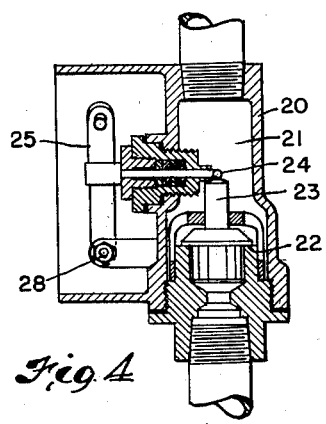
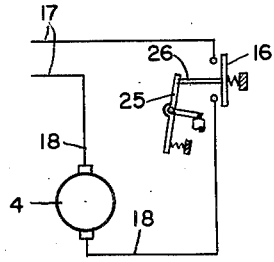
INVENTOR.
PAUL A. FRANK
BY
Oberlin & Limbach
ATTORNEYS.

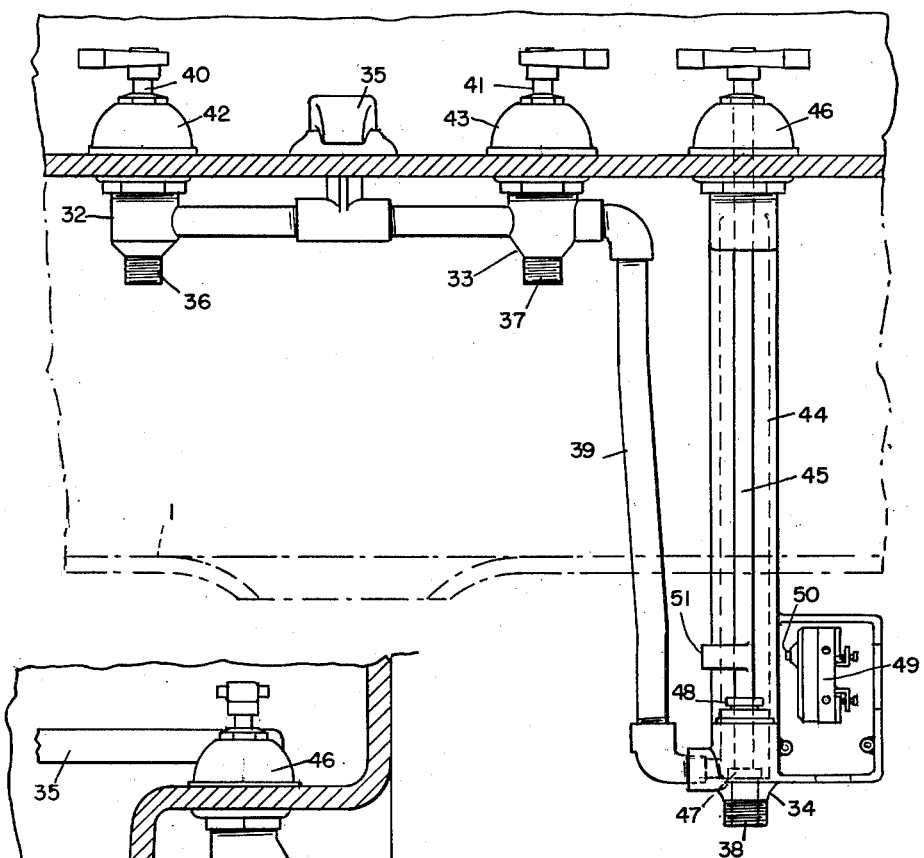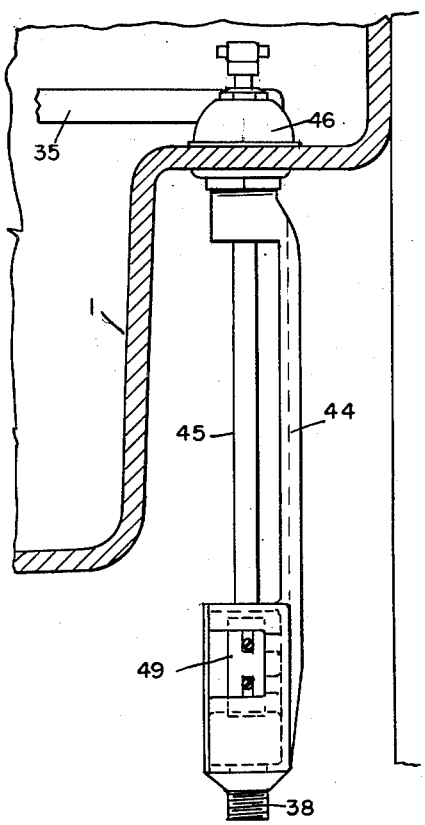

Patented Oct. 28, 1952

2,615,176

UNITED STATES PATENT OFFICE 2,615,176

WASTE DISPOSAL UNIT FOR SINKS

Paul A. Frank, Akron, Ohio, assignor to National Rubber Machinery Company, Akron, Ohio, a corporation of Ohio Application April 23, 1947, Serial No. 743,398

3 Claims. (Cl. 4—187)

This invention relates in general to a faucet disposal unit which is in the form of a single unitary assembly including a sink, water faucets and piping therefor and an electrically operated comminuting apparatus energized in response to opening of one of the faucets.

It is one principal object of this invention to provide a waste disposal unit of a form such that operation of the comminuting apparatus associated therewith to comminute food waste and other refuse deposited in such apparatus is initiated by manipulation of a particular one of several water faucets, to supply water into such apparatus and thereby facilitate carrying away of the comminuted material to a sewer or the like.

It is another object of this invention to provide a waste disposal unit which is complete in and of itself so as to require only (1) connection of two pipes to the usual hot and cold water supply pipes, (2) connection of a discharge port to a sewer, and (3) plugging in of an electrical control circuit into an electrical outlet in order to install and condition the unit for use.

It is another object of this invention to provide a waste disposal unit which may be manufactured as a complete package unit to provide a sink, water faucets and a comminuting apparatus, all of which are factory assembled, piped and wired so as to require but minor adjustment and the aforesaid simple connections prior to being used.

It is another object of this invention to provide a waste disposal unit in which the sink portion thereof may be used in its ordinary manner with water being supplied thereto at will from either or both of two faucets and in a different manner with the comminuting apparatus set in operation in response to the opening of a third faucet to supply water to the sink and to such apparatus.

It is another object of this invention to provide a waste disposal unit which is started and stopped respectively by the rate of flow of water through a flow responsive device being greater than and less than a predetermined minimum.

Other objects and advantages of the invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawings:

Fig. 1 is a front elevation view of one form of unit with the sink being shown in vertical cross section;

Fig. 2 is a side elevation of the unit illustrated in Fig. 1, the sink being in section;

Figs. 3 and 4 are front elevation and longitudinal cross section views, respectively, of the flow responsive device which controls operation of the comminuting apparatus of Fig. 1;

Fig. 5 is a schematic wiring diagram illustrating the relationship of the flow responsive device to the switch which operates the motor associated with the comminuting apparatus; and Figs. 6 and 7 are front and side elevation views, respectively, of another form of unit.

Referring now to the drawing and first to the form of the invention shown in Figs. 1 and 2, there is shown therein a unit consisting of a sink 1, a combination valve 2 on said sink and a comminuting apparatus 3 connected to the drain opening of said sink.

Said sink 1 is herein illustrated as being of a type including drain and backboards as integral parts thereof but it will be appreciated that for the purposes of the present invention the structure of the sink is immaterial except insofar as it is provided with a drain opening in its bottom wall to which the open upper end of the comminuting apparatus 3 may be connected. A sink such as illustrated is usually fitted to the top of a suitable cabinet or the like, not shown.

The comminuting apparatus 3 is preferably of that type in which the housings thereof define a chamber or cavity into which material to be comminuted is deposited through the opening at the upper end thereof and then, through the action of an impeller, not shown, which is rotated in such chamber as by an electric motor 4, such material is comminuted. Water flowing through said apparatus during the comminuting operation carries the comminuted matter to a sewer pipe 5 from a discharge port 6 which has communication with the lower end of such chamber. A number of specific forms of comminuting apparatus are well known to those skilled in the art and, therefore, such need not be herein described and illustrated in detail. A preferred form of such apparatus is disclosed in Allen L. Heston et al. application Serial No. 730,930, filed February 26, 1947 (now abandoned). The motor 4 and the housing associated with the discharge port 6 are herein shown as being swivelly connected to the upper housing of the comminuting apparatus as at 7 to permit adjustment of the discharge port 6 relative to the sewer pipe 5.

The comminuting apparatus 3 is also so formed that when it is not in operation, water may freely pass therethrough to the sewer pipe 5 to permit use of the sink in its ordinary manner.

The combination valve 2 is preferably connected to the backboard of the sink 1 and has three faucets 8, 9 and 10 thereon, the out-fall side of each of which is connected with a common discharge spout 11 and the inlet side of each of which is respectively connected to pipes 12, 13 and 14. This piping is preferably factory installed so that the ends of pipes 12 and 13 may be respectively connected directly to the hot and cold water supply pipes, not shown, which enter the kitchen from a side wall or the floor thereof. The pipe 14 and faucet 10 are connected in parallel with pipe 13 and faucet 9. Pipe 14 has interposed therein a flow responsive device 15 which operates a switch 16, see Figs. 3, 4 and 5, to start and stop flow of electric current to the motor 4 through the cord 17 and cable 18. The cord 17 is adapted to be plugged into any convenient electrical outlet.

From the above description it can be seen that to install this unit, it is only necessary to connect the pipes 12 and 13 to hot and cold water supply lines, to connect the discharge port through the intermediary of the usual trap 19 to the sewer pipe 5 and to plug the cord 17 into an electrical outlet. To further facilitate installation of this unit, the housing associated with discharge port 6 may be rotated and locked at any desired position to thus position the discharge port most conveniently relative to the sewer pipe 5. Also, as previously pointed out, the comminuting apparatus 3 permits free flow of water therethrough to the sewer pipe 5 whereby the hot and cold water faucets 8 and 9 may be manipulated independently or conjointly, as desired, and the sink used in a customary manner without impediment of any sort.

On the other hand, should it be desired to comminute material deposited into the chamber formed in the comminuting apparatus 3, the faucet 10 is simply opened to supply water to the sink through the pipe 14 and spout 11. As will now be described, such opening of faucet 10 to permit flow of water through the pipe 14 initiates operation of the comminuting apparatus 3 through the actuation of the flow responsive device 15 and the consequent closing of the switch 16. As clearly shown in Fig. 5, the closing of the contacts in switch 16 is effective to close the electric circuit to the motor 4 to thus start said motor.

The flow responsive device 15 comprises a body 20 having a passage 21 therethrough formed between its ends with a valve seat 22. The opposite ends of such passage 21 are formed with suitable ports to which pipes, tubes or the like may be connected. A valve element 23 is movable in such passage 21 into and out of engagement with seat 22 to respectively prevent or permit flow of fluid therethrough. When faucet 10 is closed, said valve element 23 will be held in a seated position both by gravity and the downward pressure exerted thereon by the end of a pivoted lever 24. The pivoted end of lever 24 passes through a suitable stuffing box in the body 20 and has connected thereto an arm 25 which is formed with one end portion disposed opposite a switch button 26 on the switch 16 and with the other end portion engaged by a spring 27 normally urging the arm in a direction to open switch 16. The spring 27, through arm 25 and lever 24, is operative to urge the valve element 23 into engagement with its seat 22. Adjustment of the compression of spring 27 is effected through a screw 28 which has threaded engagement with a lug 29 formed on the body 20. Arm 25 and lever 24 are non-rotatably locked to one another as by a set screw 30 and to provide for proper adjustment of the switch button contacting end of arm 25 and the valve element contacting end of lever 24, an adjusting screw 31 is provided on said arm. When properly adjusted the valve element 23 will be seated when the switch 16 is open and also the valve element 23 must move a predetermined minimum distance away from its seat 22 before the switch 16 will be closed. In this way the flow responsive device 15 may be adjusted so that the valve element 23 must move a certain minimum amount before the motor circuit is closed.

As a further control on the flow of water through the flow responsive device 15, the compression of spring 27 may be varied by the screw 28 as described above whereby the pressure drop due to flow of water in the flow responsive device 15 must be a certain minimum amount in order to initiate operation of the motor 4 or to continue its operation.

With two such water control means in the flow responsive device 15 properly adjusted, there is no possibility of operating the comminuting apparatus 3 with an insufficient amount of water flowing thereinto as would be the case if faucet 10 were opened only slightly or if there were an insufficient pressure in the water supply line. To summarize, it can be seen that adjustment of the screw 31 in arm 25 relative to lever 24 determines the minimum flow opening through the device 15 which is necessary to effect closing of the switch 16 and, in addition, the amount of compression of the spring 27 determines the minimum pressure drop in the liquid flowing through the device 15 which is necessary to maintain such minimum opening. As will be evident to those acquainted with fluid mechanics, the operation of motor 4 will be conditioned upon the maintenance of a predetermined minimum rate of flow through the pipe 14 and device 15. When faucet 10 is opened, a pressure differential results on opposite sides of the valve element 23 and such pressure differential, in order to effect moving of the valve element away from its seat 22, must be sufficient to overcome the forces which normally hold the same in a seated position. Furthermore, in order to retain the valve element in an unseated position, the rate of flow of water therepast must be sufficient to produce a certain pressure differential. Should the faucet 10 be opened only a small amount so that water only trickles past valve element 23, or should there be insufficient pressure in the water supply line, the rate of flow of water past the valve element will be insufficient to effect movement thereof to the point where the switch 16 is actuated.

In using this unit, the food waste or other refuse is first deposited into the comminuting apparatus 3 and then the faucet 10 is opened to cause water to flow into the sink 1 and into the comminuting apparatus 3, and to effect starting of the motor 4. The action of the comminuting apparatus 3 and the water flowing therethrough effects comminution of the refuse and the flushing of the same through the discharge port 6 into the sewer pipe 5. When the comminuting operation has been completed, the faucet 10 is simply closed to shut off the water to the sink 1. This equalizes the fluid pressures on opposite sides of valve element 23 whereupon the spring 27 urges the arm in a direction effecting opening of the switch 16 and urges the lever 24 in a direction shifting valve element 23 toward a seated position. With the motor 4 thus stopped, faucets 8 and 9 and sink 1 may be used in a customary manner. The faucet 10 is preferably located, as shown, to one side of the sink so that there will be no interference with the normal use of the sink.

In the form of unit illustrated in Figs. 6 and 7, there is mounted on the sink 1 a hot water faucet 32 and cold water faucets 33 and 34, each of which faucets has its outfall side in communication with a common discharge spout 35. A hot water supply pipe is adapted to be connected to the inlet port 36 of faucet 32. A cold water supply pipe is adapted to be connected to the inlet port 37 of faucet 33 and a cold water branch line is adapted to be connected to the inlet port 38 of faucet 34, said latter faucet having a line 39 leading from its outfall side to the outfall side of faucet 33 whereby it is then connected in parallel with faucet 33. With the faucets so piped, each may be operated independently of the others to supply water into the sink 1.

Faucets 32 and 33 are of the usual construction and are opened and closed by rotating the stems 40 and 41 thereof in opposite directions, said stems having threaded connection with bonnets 42 and 43 and having valve heads, not shown, at their lower ends movable toward and away from the seats formed in the body portions of said faucets. Said bonnets 42 and 43, of course, include suitable packing glands therein to seal the stems.

Faucet 34 which is located at the lower end of an elongated bracket member 44 on the sink is operated by rotating an elongated stem 45 in opposite directions. Said stem 45 preferably has threaded engagement with a bonnet 46 of construction similar to that of bonnets 42 and 43. Said stem 45 has a valve head 47 at its lower end. In this case a packing gland 48 is located at the faucet 34 rather than in the bonnet as in the case of faucets 32 and 33.

Also mounted at the lower end of bracket 44 is a normally open switch 49 which is wired to the motor 4 by cable 18 and cord 17 in a manner shown in Fig. 5 whereby closing of the switch starts the motor 4. The switch button 50 is operated by means of a cam 51 formed on stem 45, said cam 51 being so located that rotation of stem 45 in a direction causing opening of faucet 34 effects pushing in of button 50 to thereby close switch 49. The closing of switch 49, as aforesaid, is preferably effected when faucet 34 is fully open, otherwise suitable stops must be provided for the cam 51 in order to prevent turning of the stem 45 to a position which causes cam 51 to pass over button 50. An alternative arrangement is to make the high spot on the cam of circular cross section so that the amount of rotation of stem 45 is not critical. In any case, the switch 49 and cam 51 are so arranged that the switch 49 will be closed only when the faucet 34 has been opened to permit sufficient water to flow into the sink. This arrangement is not of course as foolproof as that of Figs. 1 and 2 in that the motor 4 may be operated with little or no water flowing into the comminuting apparatus in case the water pressure is low or is shut off. However, under normal conditions the waste to be comminuted is deposited into the comminuting apparatus and the stem 45 rotated to simultaneously start motor 4 and cause water to flow through faucet 34 into the sink. When the comminuting operation has been completed the stem 45 is simply rotated in an opposite direction to close the faucet 34 and to open the switch 49 to thus effect shutting off of the motor 4. Thereafter, the sink and the faucets 32 and 33 thereon may be used in the usual manner.

It is to be observed that because the faucet 34 and switch 49 are mounted on the lower end of an elongated bracket member which depends downwardly from the top of the sink, they are disposed below the bottom of the sink and thus are readily accessible for servicing. It is to be understood that the structure shown in Figs. 6 and 7 will be completely assembled, piped and wired to form a package unit including the sink, the faucets and the comminuting apparatus, whereby only the simple water supply, sewer and electrical connections need be made in installing the unit and conditioning it for use.

Other modes of applying the principle of the invention may be employed, change being made as regards the details described, provided the features stated in any of the following claims or the equivalent of such be employed.

I therefore particularly point out and distinctly claim as my invention:

1. In combination, a sink provided with a drain opening, an electrically operated waste disposal apparatus beneath said sink formed with a downwardly extending passage therethrough having its upper end in communication with such drain opening, hot and cold water lines leading to said sink, separate valves in each of said lines for selectively controlling flow of water into said sink and through such passage, a branch line in said cold water line ahead of the valve therein, a third valve in said branch line for selectively controlling flow of water therethrough into said sink and through such passage, a flow responsive device in said branch line having an element movable in one direction in response to flow of water through said device by the operation of the valve in said branch line to supply water into said sink, and a switch actuated by such movement of said element to energize said waste disposal apparatus.

2. In combination, a sink provided with a drain opening, an electrically operated waste disposal apparatus beneath said sink formed with a downwardly extending passage therethrough having its upper end in communication with such drain opening, a switch in circuit with said apparatus controlling energization and de-energization of the latter, hot and cold water lines leading to said sink, separate valves in each of said lines for selectively controlling flow of water into said sink and through such passage, a branch line in said cold water line ahead of the valve therein, a third valve in said branch line for selectively controlling flow of water therethrough into said sink and through such passage, and a switch actuating member in said branch line movable responsive to flow of water through said branch line for actuating said switch and thereby energizing said waste disposal apparatus.

3. In combination, a sink provided with a drain opening, an electrically operated waste disposal apparatus beneath said sink formed with a downwardly extending passage therethrough having its upper end in communication with such drain opening, a switch in circuit with said apparatus controlling energization and de-energization of the latter, a mixing unit on said sink provided with a single discharge port, hot and cold water lines leading to said sink, a branch line in said cold water line, a valve in each of said lines for selectively controlling flow of water into said sink and through such passage and each having its out-fall side connected to the discharge port of said mixing unit, and a switch actuating member in said branch line movable responsive to flow of water through said branch line for actuating said switch and thereby energizing said waste disposal apparatus.

PAUL A. FRANK.

REFERENCES CITED

The following references are of record in the file of this patent:

UNITED STATES PATENTS

| Number | Name | Date |
|---|---|---|
| 1,174,656 | Beckwith | Mar. 7, 1916 |
| 2,012,680 | Hammes | Aug. 27, 1935 |
| 2,044,564 | Carter | June 16, 1936 |
| 2,244,373 | Powers | June 3, 1941 |
| 2,244,402 | Powers | June 3, 1941 |
| 2,418,366 | Powers | Apr. 1, 1947 |